Dec. 27, 1960   H. KASSINGER   2,966,435
DOUBLE GLAZED INSULATING WINDOW UNIT
Filed Nov. 26, 1958
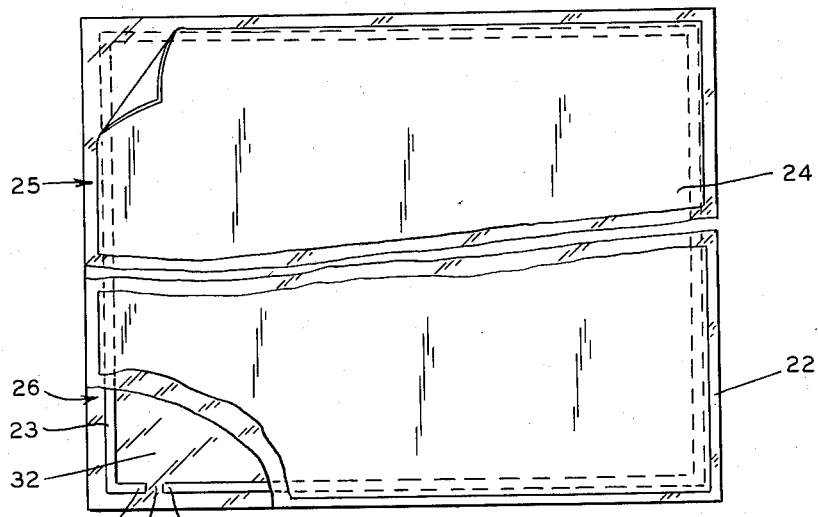
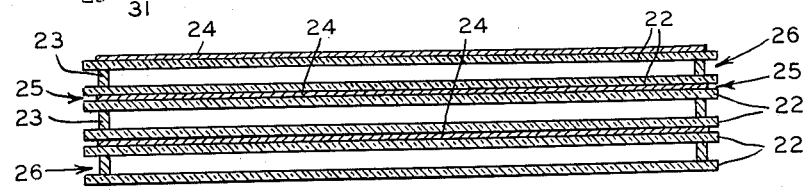
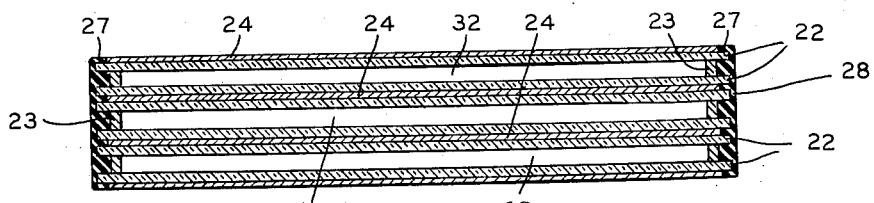
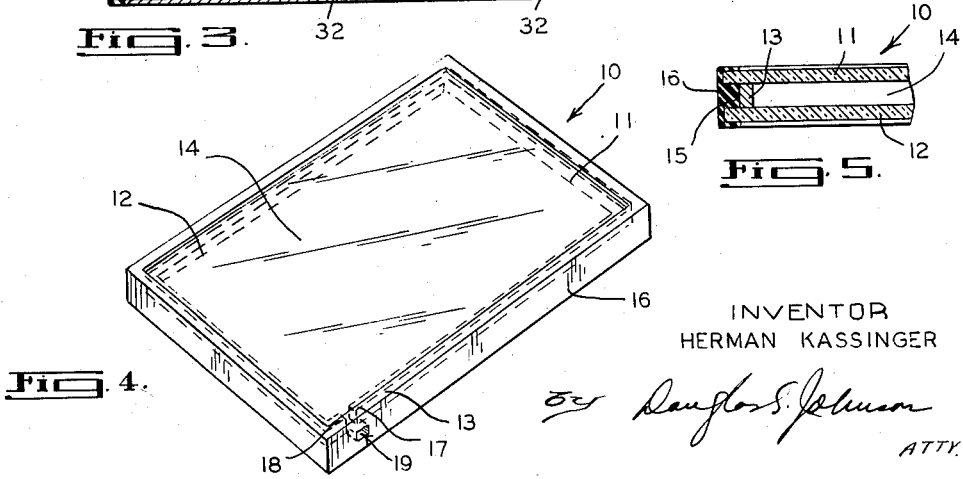
INVENTOR
HERMAN KASSINGER
ATTY.

United States Patent Office

2,966,435
Patented Dec. 27, 1960

2,966,435

DOUBLE GLAZED INSULATING WINDOW UNIT

Herman Kassinger, 901 Colborne St., Oshawa, Ontario, Canada

Filed Nov. 26, 1958, Ser. No. 776,606

2 Claims. (Cl. 154—2.71)

This invention relates to improvements in double glazed insulating window units.

The principal object of this invention is to provide a double glazed insulating window unit which can be manufactured very much more cheaply than the units presently on the market.

Another important object of this invention is to provide a method of manufacture of double glazed insulating window units which increases productivity.

Still another object of this invention is to provide a window unit as aforesaid which can be constructed from components which are readily available through a building supplier or retail outlets and to manufacture the units without the use of highly specialized equipment or the employment of highly skilled labour.

Another object of this invention is to provide a double glazed window unit which has excellent optical and insulating characteristics.

The principal feature of this invention resides in providing a double glazed window unit comprising two panes of glass of like configuration arranged in superimposed parallel relation and spaced by a strip of material having a configuration corresponding to the peripheral edges of the glass panes but of lesser perimetral extent, the panes of glass and spacer arranged to define an internal chamber and a peripheral trough or groove which is filled with a resilient bonding agent to join the panes and the strip in assembled relation and to seal off the internal chamber from the atmosphere.

Another feature of this invention resides in forming the strip of material so that its ends are spaced apart to define a passage therebetween to provide an access opening to the internal chamber for controlling moisture content in or exhausting the chamber atmosphere.

Another feature of this invention resides in employing a bonding agent which can be applied in its plastic state to substantially completely fill the peripheral groove formation and which, after setting, exhibits resiliency to cushion the panes of glass in their assembled relation against shock or vibrations.

An important feature of this invention resides in the manufacture of the window units comprising arranging a pair of glass panes of like dimension in superimposed relation, spacing the superimposed panes with a continuous separator in the form of strip material adjacent to their peripheries and extending substantially completely therearound but with the ends of the strip spaced to define a passage therebetween, the panes and strip defining an internal chamber and an external peripheral channel or groove, the groove then being filled with a bonding agent in a plastic state which is dried to an elastic hardness to seal the glass panes and strip together, the atmosphere within the internal chamber being exhausted or dried by way of the passage between the strip ends in a suitable manner to eliminate moisture condensation over a range of temperatures, the passage then being sealed to isolate the internal chamber from the atmosphere.

Another important feature in the manufacture of the window units resides in arranging a plurality of components for the window units in superimposed relation, each unit being spaced from the next adjacent one by suitable spacers, as for example, paper sheets, the bonding agent being applied in its plastic state to the stacked units in a single operation to substantially completely fill the plurality of peripheral grooves, the stack being dried to bring the bonding agent to elastic hardness and the units being separated prior to the final setting of the bonding agent to provide a plurality of separate units.

These and other objects and features are described in the following specification to be read in conjunction with the sheet of drawings in which:

Figure 1 is a plan view partly broken away of a plurality of window unit components arranged in stacked relation in the manufacture of same, in accordance with the invention;

Figure 2 is a mid-vertical sectional view of the stack of window units of Figure 1;

Figure 3 is a view similar to Figure 2 with the resilient bonding agent applied to the peripheral grooves;

Figure 4 is a perspective view of a window unit constructed in accordance with the invention;

Figure 5 is a vertical mid-sectional view partly broken away of an edge of the window unit of Figure 4.

A double glazed insulating window unit constructed in accordance with this invention is shown at 10 in Figure 4.

The window unit 10 comprises two rectangular panes of glass 11 and 12 of like configuration arranged in superimposed parallel relation, the panes of glass 11 and 12 being spaced by a thin strip member 13 bent upon itself to correspond in outline to the rectangular peripheries of the panes of glass but having a lesser perimetral extent.

It will be appreciated that the panes of glass may be given a different configuration or outline as desired and similarly, the strip 13 may be bent in accordance with that outline.

The strip 13 may be constructed of any suitable material but preferably, is formed of aluminum which is light in weight, easily shaped and substantially free from corrosive deterioration.

With reference to Figure 5 of the drawings, it is seen that the panes 11 and 12, arranged in superimposed relation and separated by the strip 13 define an internal chamber 14 and an external peripheral channel or trough formation 15.

The edges of the panes of glass 11 and 12 are embedded in a peripheral edge formation 16 which is composed of a rubber-like substance having strong and durable adhesive properties as well as possessing an elastic hardness in its solidified state.

A compound selected for use in the manufacture of these window units is sold under the name Sonolastic Sealing compound by Sonneborn Limited, Toronto, Canada. This compound is sold as a paste and comprises essentially a sulphur rubber polymer having a catalyst to activate the polymer to an elastic hardness upon the paste being dried at approximately 100° F. for eight hours. This compound in its hardened state is extremely tenacious and resilient and is eminently suitable for the purposes aforesaid.

As will be seen, especially in Figures 4 and 5, the edge formation 16 encases the edges of the panes of glass 11 and 12 and completely fills the trough or channel 15 contacting both the inner surfaces of the panes of glass and the surface of the strip 13.

The edge formation 16 initially is applied as a paste around the assembled window unit 10 in the same manner as, for example, putty is applied in the setting of glass in a window. This sealing compound must be packed into the trough formation 15 to effect a positive seal between the glass and the metal in order that the internal chamber 14 may be sealed off from the atmosphere to provide an insulating chamber.

The ends 17 and 18 of strip 13 are spaced one from the other to define a passage 19 leading into the internal chamber 14 as best seen in Figure 4, to provide access to the internal chamber 14 so that it can be rendered substantialy free of moisture. This may be accomplished either by exhausting the atmosphere of chamber 14 or by replacing it with hot dry air by means of suitable apparatus. The passageway 19 is then sealed off with the sealing compound. In this manner an internal insulating chamber substantially free of moisture is provided.

The construction of the double-glazed window unit 10 lends itself to a novel method of manufacture which will now be described.

With reference to Figures 1, 2 and 3 of the drawings, a plurality of panes of glass designated at 22 of like configuration are arranged in superimposed parallel relation, each pair of glass panes 22 having a spacer bar or strip 23 inserted therebetween.

Each unit so constructed is spaced from the next adjacent unit by a thin sheet of material 24 of approximately 1/16" in thickness. This thin sheet of material may be of paper and it is also pointed out that the sheet has a lesser perimetral extent than the panes of glass to define a thin peripheral channel 25 therewith.

In this manner each window unit is held apart one from the other to enable ready separability at the completion of the operation as will be described.

Window units so arranged constitute a stack having a regular configuration illustrated in Figures 1 and 2 and are adapted to be held in stacked relation while a sealing compound of the type aforementioned in the form of paste is applied to the stacked sides to fill all the peripheral grooves 25 and troughs 26 defined by the panes of glass 22, spacer members 23 and sheets of paper 24.

The stack is then heated to approximately 100° F. and maintained at that temperature for approximately eight hours to bring the sealing compound to an elastic hardness whereupon each unit is then separated one from the other by inserting a knife blade or the like into the thin peripheral channel 25 defined by the paper member 24 and the sheets of glass 22.

The sealing compound at this time has not completely set and is yieldable under the action of the knife blade, the knife blade cutting through the compound intermediate the adjacent glass plates 22 and leaving an edge formation 27 as best seen in Figure 4 whereby the edges of the glass panes are completely embedded in the edge formation or frame 28.

Preferably in this operation ends 29 and 30 of the spacer strips 23 remain uncovered so that passages 31 are defined therebetween for communication with the internal chambers 32.

At this stage the atmosphere in the internal chambers 32 of the window units may be exhausted or they may be replaced by hot dry air and then the passages are sealed. Thus the chambers 32 are rendered substantially moisture-free over the range of temperatures to which they are to be subjected in use.

While the preferred embodiment of this invention and the preferred method of manufacture have been described and illustrated, it will be appreciated that various changes in both the structure and the method may be undertaken by those skilled in the art without departing from the spirit and scope of the invention as defined in the appended claims.

What I claim is:

1. A method of manufacturing a double glazed window unit comprising arranging a series of panes of glass of like configuration in superimposed parallel relation with a sheet of material between each pair of panes, each said sheet having a smaller perimeter than that of said panes, and defining a first peripheral channel with adjacent panes and with peripheral spacer means between the panes of each said pair of panes defining a second peripheral channel therewith, filling the first and second channels and coating the edges of said panes with a plastic bonding agent, curing said bonding agent to an elastic hardness and cutting through the bonding agent in the said first channel to separate said units.

2. The method defined in claim 1 wherein said bonding agent is a catalysed sulphur rubber compound.

References Cited in the file of this patent

UNITED STATES PATENTS

| | | |
|---|---|---|
| 1,495,948 | Carney | May 27, 1924 |
| 2,342,758 | Saunders et al. | Feb. 29, 1944 |
| 2,684,266 | Englehart | July 20, 1954 |

FOREIGN PATENTS

| | | |
|---|---|---|
| 527,822 | Great Britain | Oct. 16, 1940 |